US011814119B2

(12) United States Patent
Westberg et al.

(10) Patent No.: US 11,814,119 B2
(45) Date of Patent: Nov. 14, 2023

(54) ARRANGEMENT OF A DRIVE WHEEL FOR AN ENDLESS TRACK OF A TRACKED VEHICLE

(71) Applicant: BAE Systems Hägglunds Aktiebolag, Örnsköldsvik (SE)

(72) Inventors: Björn Westberg, Arnäsvall (SE); Anders Bergkvist, Köpmanholmen (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 17/616,949

(22) PCT Filed: Jun. 4, 2020

(86) PCT No.: PCT/SE2020/050563
§ 371 (c)(1),
(2) Date: Dec. 6, 2021

(87) PCT Pub. No.: WO2020/246936
PCT Pub. Date: Dec. 10, 2020

(65) Prior Publication Data
US 2022/0219771 A1    Jul. 14, 2022

(30) Foreign Application Priority Data
Jun. 7, 2019    (SE) ................... 1950678-1

(51) Int. Cl.
*B62D 55/135*    (2006.01)
*B62D 55/13*    (2006.01)
(Continued)

(52) U.S. Cl.
CPC ........... *B62D 55/135* (2013.01); *B62D 55/13* (2013.01); *B62D 55/32* (2013.01); *B62D 55/202* (2013.01)

(58) Field of Classification Search
CPC .................................................. B62D 55/135
See application file for complete search history.

(56) References Cited

U.S. PATENT DOCUMENTS 4,881,930 A * 11/1989 Oertley ............. B62D 55/0963
                                                                             474/901
5,203,861 A      4/1993   Irwin et al.
(Continued)

FOREIGN PATENT DOCUMENTS

CN      201980312 U   *   9/2011
CN      107963138 A      4/2018
(Continued)

OTHER PUBLICATIONS

International Search Report and Written Opinion for International Application No. PCT/SE2020/050563 dated Jul. 2, 2020, 16 pages.
(Continued)

*Primary Examiner* — Kevin Hurley
(74) *Attorney, Agent, or Firm* — MORRISON & FOERSTER LLP (57) ABSTRACT

The present invention relates to a fastening arrangement of a drive wheel (DW) for an endless track (E) of a tracked vehicle (V) the drive wheel (DW) comprising a hub member (H) and a drive sprocket member (S1, S2). Said drive sprocket member comprises a set of teeth (10) arranged around the circumference of said drive sprocket member (S1, S2), said teeth (10) being configured to engage with said endless track (E). Said drive sprocket member (S1, S2) further comprises a support member (20) for teeth (10) of said drive sprocket member. Said teeth (10) are configured to be removably attached to said support member (20). Said fastening arrangement is configured for fastening one or more teeth (10) of the set of teeth (10) to the support member (20). Said fastening arrangement comprises a set of dovetail shaped recesses (22) of said support member (20). Each
(Continued)

dovetail shaped recess (22) is configured to receive a locking portion (12) of one or more teeth (10) so as to provide a locking function for said one or more teeth (10). The present invention also relates a tracked vehicle.

13 Claims, 7 Drawing Sheets

(51) Int. Cl.
  *B62D 55/32* (2006.01)
  *B62D 55/20* (2006.01)

(56) References Cited

U.S. PATENT DOCUMENTS

| | | | |
|---|---|---|---|
| 10,737,735 B2 * | 8/2020 | Obermeier-Hartmann | ................. B62D 55/12 |
| 2014/0333125 A1 | 11/2014 | Hoyt | |
| 2022/0250695 A1 * | 8/2022 | Söderström | ............ B62D 55/13 |

FOREIGN PATENT DOCUMENTS

| | | | | |
|---|---|---|---|---|
| DE | 4315355 A1 | * | 11/1994 | ........... B62D 55/092 |
| DE | 4444982 A1 | | 6/1995 | |
| EP | 672004 B1 | | 6/1996 | |
| EP | 2088063 A2 | | 8/2009 | |
| WO | WO-2017185174 A1 | | 11/2017 | |

OTHER PUBLICATIONS

Swedish Search Report for Swedish Application No. SE1950678-1 dated Nov. 25, 2019, 3 pages.
Extended European Search Report and Written Opinion received for European Patent Application No. 20818514.0 dated May 24, 2023, 8 pages.

* cited by examiner

ARRANGEMENT OF A DRIVE WHEEL FOR AN ENDLESS TRACK OF A TRACKED VEHICLE

CROSS REFERENCE TO RELATED APPLICATIONS

This application is a national stage application under 35 U.S.C. § 371 of International Application No. PCT/SE2020/050563, filed internationally on Jun. 4, 2020, which claims priority to SE 1950678-1, filed Jun. 7, 2019, the entire contents of each are incorporated by reference herein.

TECHNICAL FIELD

The present invention relates to an arrangement of a drive wheel for an endless track of a tracked vehicle. The present invention also relates to a tracked vehicle comprising drive wheels having such an arrangement.

BACKGROUND

Tracked vehicles may be equipped with opposite track assemblies. Each track assembly comprises an endless track arranged to run over a set of wheels comprising a drive wheel, a tension wheel and a set of road wheels there between.

A drive wheel may be equipped with a hub member and an inner drive sprocket member and an outer drive sprocket member connected to the respective side of the hub member.

Wear on drive wheels is relatively large. When using endless tracks of rubber, exchange of drive wheels need to be performed in a workstation, where the each drive sprocket member of the drive wheel needs to be removed. Thus, when the tracked vehicle is not in access of a workstation and there is a need to exchange a drive wheel due to wear on teeth of drive sprocket members a problematic situation may occur.

Drive wheels with exchangeable teeth are known, which may facilitate such exchange.

There is however a need for providing an arrangement of a drive wheel for an endless track which further facilitates maintenance of the drive wheel.

OBJECTS OF THE INVENTION

An object of the present invention is to provide an arrangement of a drive wheel for an endless track which further facilitates maintenance of the drive wheel.

A further object of the present invention is to provide a vehicle comprising such an arrangement.

SUMMARY OF THE INVENTION

These and other objects, apparent from the following description, are achieved by an arrangement and a vehicle, as set out in the appended independent claims. Preferred embodiments of the arrangement are defined in appended dependent claims.

According to the invention the objects are achieved by a fastening arrangement of a drive wheel for an endless track of a tracked vehicle. The drive wheel comprises a hub member and a drive sprocket member. The drive sprocket member comprises a set of teeth arranged around the circumference of said drive sprocket member. Said teeth are configured to engage with said endless track. Said drive sprocket member further comprises a support member for teeth of said drive sprocket member. Said teeth are configured to be removably attached to said support member. Said fastening arrangement is configured for fastening one or more teeth of the set of teeth to the support member. Said fastening arrangement comprises a set of dovetail shaped recesses of said support member. Each dovetail shaped recess is configured to receive a locking portion of one or more teeth so as to provide a locking function for said one or more teeth.

By thus providing a fastening arrangement having such a set of dovetail shaped recesses arranged in the support member and configured to receive a locking portion of one or more teeth, easy and efficient maintenance is facilitated in that teeth may be easily and efficiently exchanged and easily and efficiently locked on the support member. With such dovetail shaped recesses, efficient geometrical locking of teeth is facilitated.

According to an embodiment of the fastening arrangement said support member has a front side, wherein the dovetail shaped recess is arranged on the front side of said support member. Hereby is facilitated easy access of the dovetail shaped recess for easy and efficient locking.

According to an embodiment of the fastening arrangement said dovetail shaped recess is configured to run radially in said support member. According to an embodiment of the fastening arrangement said dovetail shaped recess is configured to run radially in said support member on the front side of said support member. Hereby easy and efficient locking of teeth to said support member is facilitated. With such dovetail shaped recesses configured to run radially in said support member, efficient geometrical locking of teeth is facilitated in that said teeth will both be pressed towards the flanks and inwardly.

According to an embodiment of the fastening arrangement said dovetail shaped recess is configured to narrow in the radial direction from the periphery towards the centre of the support member. With such dovetail shaped recesses configured to run radially in said support member, efficient geometrical locking of teeth is facilitated in that said teeth will both be pressed towards the flanks and inwardly.

According to an embodiment of the fastening arrangement said dovetail shaped recess is configured to narrow outwardly from said support member. According to an embodiment of the fastening arrangement said dovetail shaped recess is configured to narrow outwardly from said support member in a direction away from the hub member. With such dovetail shaped recesses configured to run radially in said support member, efficient geometrical locking of teeth is facilitated in that said teeth will both be pressed towards the flanks and inwardly.

According to an embodiment of the fastening arrangement said dovetail shaped recess has opposite inner walls and a recess bottom, the dovetail shaped recess being configured to narrow from said recess bottom towards said front side of said support member.

According to an embodiment of the fastening arrangement said dovetail shaped recess is arranged to receive a locking portion of one tooth.

According to an embodiment of the fastening arrangement said dovetail shaped recess is arranged to receive a locking portion of more than one tooth.

According to an embodiment said arrangement further comprises a bolt joint for attaching one or more teeth in association with a dovetail shaped recess.

According to an embodiment of the fastening arrangement said dovetail shaped recess is arranged to face away from said hub member. According to an embodiment of the fastening arrangement said front side of the support member with the dovetail shaped recess is arranged to face away from said hub member.

According to an embodiment of the fastening arrangement said drive wheel comprises an outer drive sprocket member arranged on the outer side of the hub member and an inner drive sprocket member arranged on the inner side of the hub member.

According to the invention the objects are achieved by a drive wheel comprising an arrangement as set out herein.

According to the invention the objects are achieved by a vehicle comprising an arrangement as set out herein.

DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Herein the term "rubber" in relation to "rubber track" refers to any elastic material such as rubber, elastomers or combinations of rubber and elastomers.

According to an aspect of the present disclosure fastening arrangement of a drive wheel for an endless track of a tracked vehicle is provided. The fastening arrangement is a fastening arrangement for facilitating maintenance of the drive wheel. The fastening arrangement is a fastening arrangement for facilitating exchange and reassembling of teeth of a drive sprocket member of the drive wheel.

Such a tracked vehicle may comprise a right track assembly and a left track assembly for driving the vehicle. Such a tracked vehicle may alternatively be a tracked vehicle with a single track assembly. Each track assembly may comprise a drive wheel, a tension wheel, a set of road wheels and an endless track arranged to run over said wheels. The endless track of the respective track assembly may be arranged to be driven and hence rotated by means of said drive wheel. The tracked vehicle may comprise drive means for driving said drive wheels. The drive means may be any suitable drive means such as one or more internal combustion engines and/or one or more electric machines.

The endless track of the respective track assembly may have any suitable configuration and be of any suitable material. The endless track of the respective track assembly may according to an aspect of the present disclosure be a rubber track. The endless track of the respective track assembly may according to an aspect of the present disclosure be a steel track.

The drive wheel comprises a hub member and a drive sprocket member. The drive sprocket member is attached to the hub member.

According to an aspect of the present disclosure said drive wheel comprises an outer drive sprocket member arranged on the outer side of the hub member and an inner drive sprocket member arranged on the inner side of the hub member.

According to an aspect of the present disclosure said hub member has a front side or outer side configured to face out from the side of the vehicle and an opposite rear side or inner side configured to face towards the side of the vehicle when the drive wheel is mounted to the vehicle, i.e. mounted to the track assembly of the tracked vehicle.

For a tracked vehicle with a single track assembly having a single drive wheel, the drive wheel comprises a hub member and a drive sprocket member attached to the hub member. In this case the drive wheel comprises a first drive sprocket member arranged on one side of the hub member and a second drive sprocket member arranged on the opposite side of the hub member. The hub member hereby has a first side configured to face out from one side of the vehicle and an opposite second side configured to face out from the opposite side of the vehicle, when the drive wheel is mounted to the single track assembly of the vehicle.

According to an aspect of the present disclosure said drive wheel may be provided with a single drive sprocket member. The drive wheel according to the present disclosure may according to an aspect of the present disclosure be provided with a single drive sprocket member having teeth arranged around the circumference of said single drive sprocket member and one support member for said teeth. The teeth are configured to be removably attached to the single support member of the drive sprocket member.

The drive sprocket member comprises a set of teeth arranged around the circumference of said drive sprocket member. Said teeth are configured to engage with said endless track. Said drive sprocket member further comprises a support member for teeth of said drive sprocket member. Said teeth are configured to be removably attached to said support member.

When said drive wheel is arranged at the tracked vehicle a set of the teeth of the drive sprocket member may be engaged with the endless track and another set of the teeth of the drive sprocket member may be at a rotated position of the drive wheel so that they are not engaged with the endless track and may thus be removed and exchanged. The drive wheel may then be rotated to another rotated position of the drive wheel so that another set of the teeth of the drive sprocket member is not engaged with the endless track and may thus be removed and exchanged.

Said fastening arrangement is configured for fastening one or more teeth of the set of teeth to the support member. Said fastening arrangement comprises a set of dovetail shaped recesses of said support member. Each dovetail shaped recess is configured to receive a locking portion of one or more teeth so as to provide a locking function for said one or more teeth. Each dovetail shaped recess is configured to receive a locking portion of one or more teeth so as to provide efficient geometrical locking of teeth is.

According to an aspect of the present disclosure said support member has a front side, wherein the dovetail shaped recess is arranged on the front side of said support member. By thus arranging the dovetail shaped recess on the front side, easy access for easy fastening of one or more teeth is provided. According to an aspect of the present disclosure said dovetail shaped recess is configured to run radially in said support member. According to an aspect of the present disclosure said dovetail shaped recess is configured to run radially in said support member on the front side of said support member. According to an aspect of the present disclosure said dovetail shaped recess is configured to run radially in said support member so that, when said locking portion of one or more teeth is lockingly arranged in the dovetail shaped recess, said teeth will both be pressed towards the flanks and inwardly of the dovetail shaped recess for efficient geometrical locking of teeth.

According to an aspect of the present disclosure said dovetail shaped recess is configured to narrow in the radial direction from the periphery towards the centre of the support member. According to an aspect of the present disclosure said dovetail shaped recess is configured to narrow in the radial direction from the periphery towards the centre of the support member so that, when said locking portion of one or more teeth is lockingly arranged in the dovetail shaped recess, said teeth will both be pressed towards the flanks and inwardly of the dovetail shaped recess for efficient geometrical locking of teeth.

According to an aspect of the present disclosure said dovetail shaped recess is configured to narrow outwardly from said support member. According to an aspect of the present disclosure said dovetail shaped recess is configured to narrow outwardly from said support member so that, when said locking portion of one or more teeth is lockingly arranged in the dovetail shaped recess, said teeth will both be pressed towards the flanks and inwardly of the dovetail shaped recess for efficient geometrical locking of teeth.

Herein the term "the dovetail shaped recess is configured to narrow outwardly from said support member" may refer to the dovetail shaped recess narrowing in the direction away from the hub member, when the support member is mounted to the hub member. According to an aspect of the present disclosure said dovetail shaped recess is configured to narrow outwardly from said support member in a direction away from the hub member. A drive wheel may have an outer drive sprocket member arranged on the outer side of the hub member and an inner drive sprocket member arranged on the inner side of the hub member. For such a drive wheel, a dovetail shaped recess of the outer drive sprocket member is configured to narrow in the direction away from the hub member, i.e. outwardly from said support member, and a dovetail shaped recess of the inner drive sprocket member is configured to narrow in the direction away from the hub member, i.e. outwardly from said support member.

According to an aspect of the present disclosure said support member has a front side and an opposite rear side. The front side of the support member is configured to face away from the hub member and the rear side is configured to face towards the hub member when attached to the hub member. According to an aspect of the present disclosure said support member of the respective drive sprocket member has a front side and an opposite rear side. According to an aspect of the present disclosure front side of the support member of the outer drive sprocket member is configured to face away from the front side of the hub member when attached to the hub member and the front side of the support member of the inner drive sprocket member is configured to face away from the rear side of the hub member when attached to the hub member.

According to an aspect of the present disclosure said support member has a ring shaped configuration. According to an aspect of the present disclosure said support member has a wheel shaped configuration. According to an aspect of the present disclosure said support member has an outer cylindrical configuration with a radius greater than the height. According to an aspect of the present disclosure said support member has a ring shaped configuration with an outer side configured to face said endless wheel when said drive wheel is attached to the track assembly of the tracked vehicle. According to an aspect of the present disclosure said support member has a ring shaped configuration with an outer circumference and a centre. According to an aspect of the present disclosure said support member has a ring shaped configuration with a periphery and a centre. The centre of the support member may correspond to the axil centre of the drive wheel.

Herein the term "the dovetail shaped recess is configured to narrow outwardly from said support member" may refer to the dovetail shaped recess narrowing in the direction away from the hub member, said direction away from the hub member corresponding to a direction essentially parallel to the centre axis of the drive wheel.

According to an aspect of the present disclosure said dovetail shaped recess is configured so that, when said locking portion of one or more teeth is lockingly arranged in the dovetail shaped recess, said teeth will both be pressed towards the flanks and inwardly of the dovetail shaped recess for efficient geometrical locking of teeth is.

According to an aspect of the present disclosure said dovetail shaped recess has opposite inner walls configured to run from the outer side of the support member along the front side towards a central portion of the support member. According to an aspect of the present disclosure the inner walls are configured to run towards each other from the outer side towards a central area of the support member and are thus narrowing each other. According to an aspect of the present disclosure the respective inner wall of said recess has an inclination relative to the direction perpendicular to the radial direction of the support member such that the inner walls are leaning towards each other. According to an aspect of the present disclosure said dovetail shaped recess has a recess bottom. According to an aspect of the present disclosure the dovetail shaped recess is configured to narrow from said recess bottom towards said front side of said support member.

According to an aspect of the present disclosure said dovetail shaped recess has opposite inner walls and a recess bottom, the dovetail shaped recess being configured to narrow from said recess bottom towards said front side of said support member. Hereby efficient geometrical locking of teeth is facilitated.

The locking portion has opposite outer walls configured to run from the outer side along the front side towards a central portion of the support member. The opposite outer walls are configured to face the inner walls of the dovetail shaped recess when a tooth is attached to the support member. The locking portion has an outer side configured to face in the same direction as the outer side of the support member when a tooth is attached to the support member.

The locking portion has an inner side, opposite to said outer side, configured to face towards an inner end of the dovetail shaped recess of the support member when the tooth is attached to the support member.

According to an aspect of the present disclosure said dovetail shaped recess is arranged to receive a locking portion of one tooth.

According to an aspect of the present disclosure said dovetail shaped recess is arranged to receive a locking portion of more than one tooth.

According to an aspect of the present disclosure said fastening arrangement further comprises a bolt joint for attaching one or more teeth in association with a dovetail shaped recess.

According to an aspect of the present disclosure said dovetail shaped recess is arranged to face away from said hub member.

According to an aspect of the present disclosure said front side of the support member is arranged to face away from said hub member.

According to an aspect of the present disclosure said front side of the support member with the dovetail shaped recess is arranged to face away from said hub member.

Figure 1:
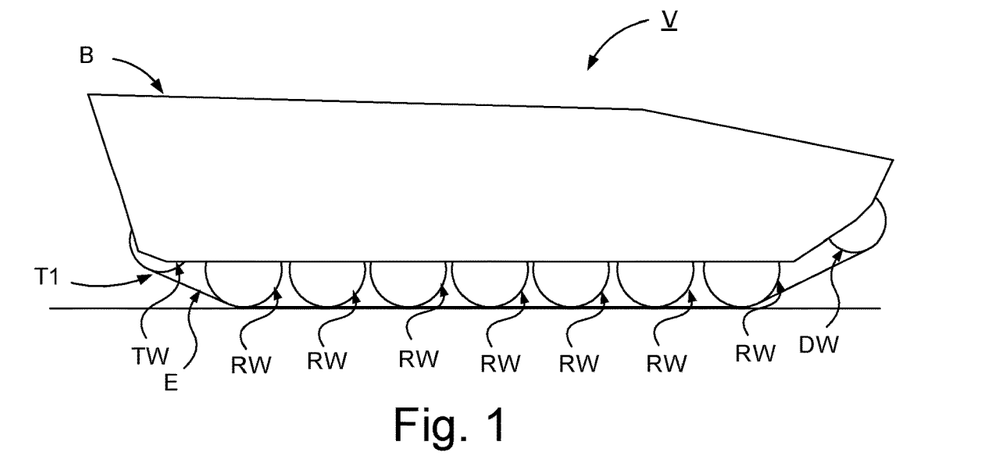
FIG. 1 schematically illustrates a side view of a tracked vehicle according to an embodiment of the present disclosure.

FIG. 1 schematically illustrates a side view of a tracked vehicle V according to an embodiment of the present disclosure.

The vehicle V is according to the disclosure in FIG. 1 a military vehicle.

The tracked vehicle V comprises a vehicle body B, which according to an aspect of the present disclosure comprises the chassis of the vehicle V and bodywork.

The tracked vehicle V comprises a right track assembly T1 and a left track assembly for driving the vehicle V, the right track assembly T1 being shown in FIG. 1. Each track assembly comprises a drive wheel DW, a tension wheel TW, a set of road wheels RW and an endless track E arranged to run over said wheels. Here the drive wheel DW is arranged in the front, the tension wheel TW is arranged in the back and the road wheels RW are arranged between the drive wheel DW and the tension wheel TW. The tracked vehicle according to the present disclosure may however have track assemblies with any suitable arrangement of drive wheel, tension wheel and road wheels. According to an aspect of the present disclosure the tension wheel may be arranged in the front, the drive wheel arranged in the back and the road wheels arranged there between.

The endless track E of the respective track assembly is arranged to be driven and hence rotated by means of said drive wheel DW. The tracked vehicle V comprises a drive means, not shown, for driving said drive wheels DW. The drive means may be any suitable drive means such as an internal combustion engine and/or an electric machine.

The endless track of the respective track assembly may have any suitable configuration and be of any suitable material. The endless track E of the respective track assembly may, according to an aspect of the present disclosure, be a rubber track. The endless track of the respective track assembly may, according to an aspect of the present disclosure, be a steel track.

Figure 2:
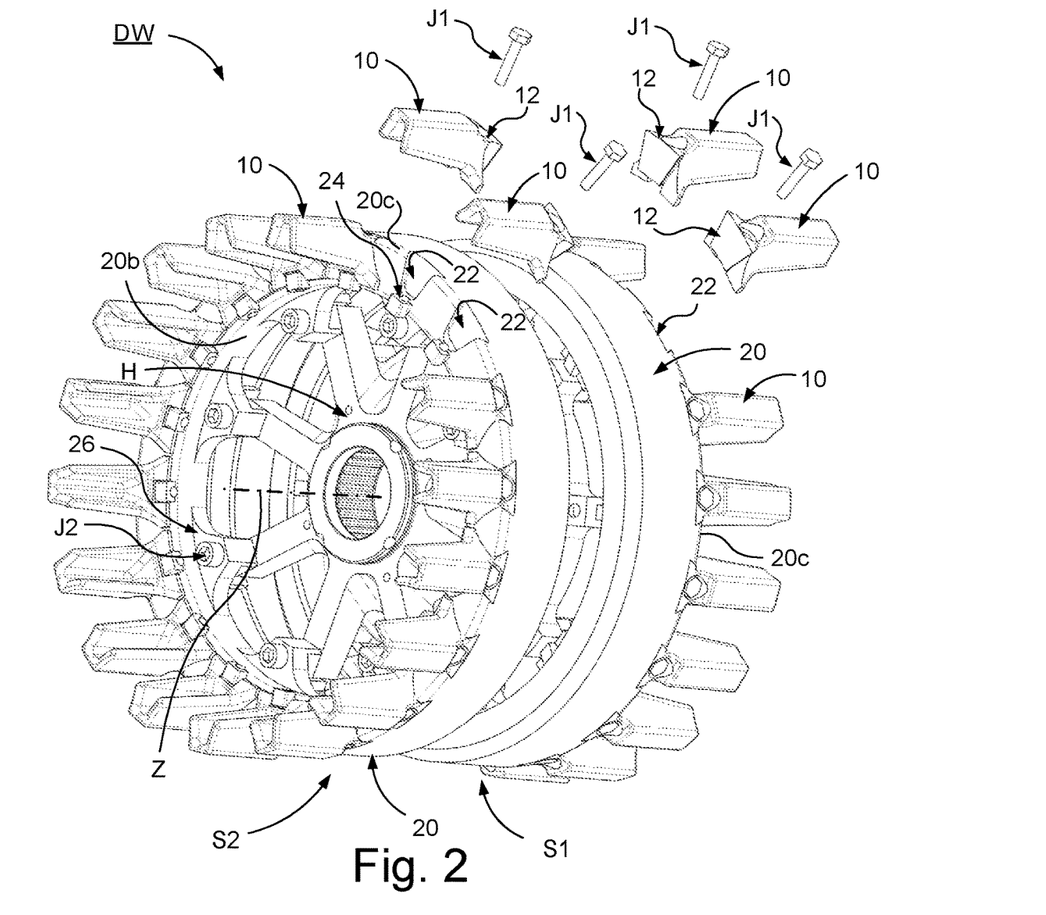
FIG. 2 schematically illustrates a perspective view of a drive wheel for an endless track of a tracked vehicle according to an embodiment of the present disclosure.
Figure 3:
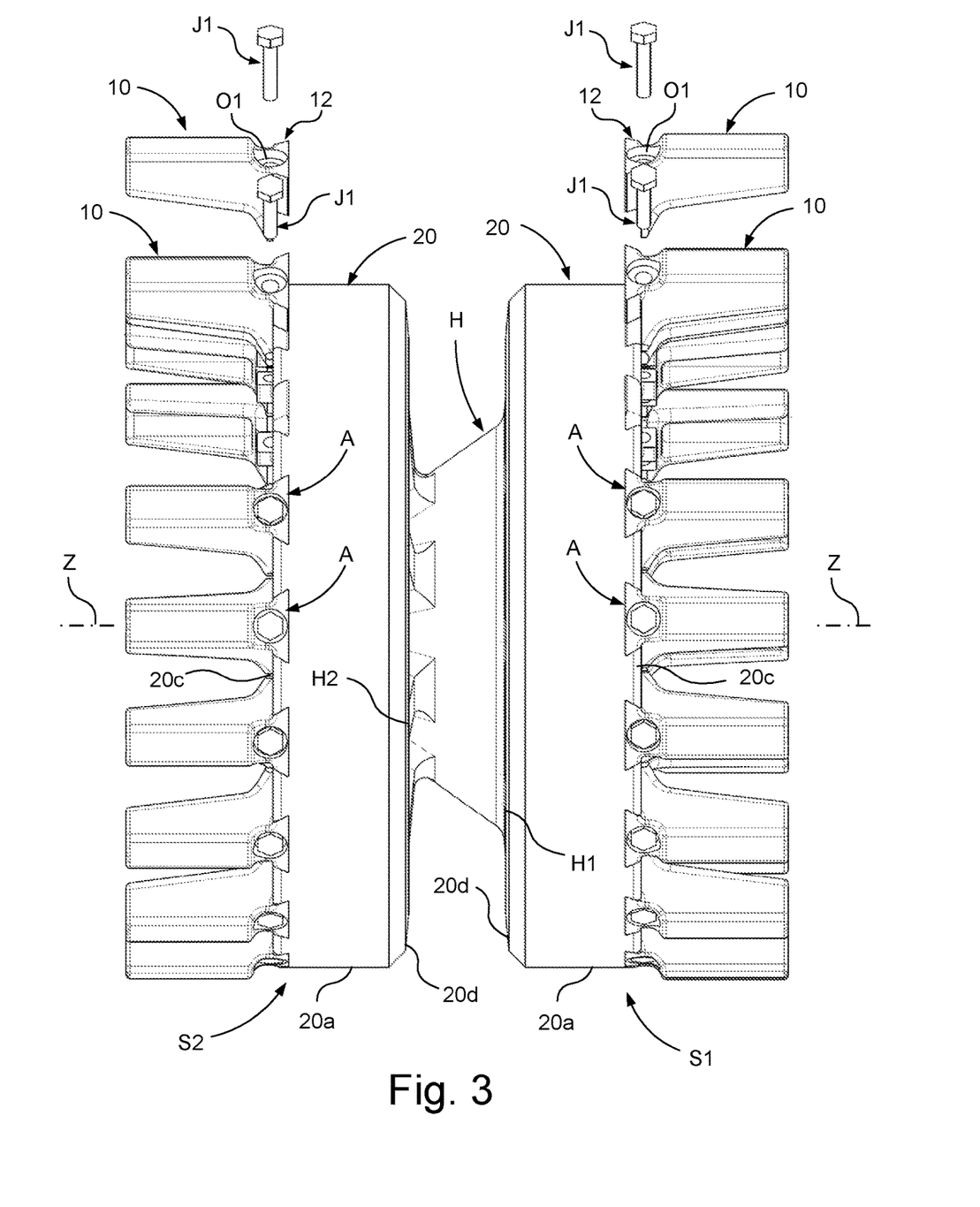
FIG. 3 schematically illustrates a side view of the drive wheel in FIG. 2 according to an embodiment of the present disclosure.

FIG. 2 schematically illustrates a perspective view of a drive wheel DW for an endless track of a tracked vehicle according to an embodiment of the present disclosure; and FIG. 3 schematically illustrates a side view of the drive wheel DW in FIG. 2 according to an embodiment of the present disclosure.

The drive wheel DW has a centre axis Z. The drive wheel DW comprises a hub member H. The hub member H is configured to be operably engaged with the drive axle of the drive means of the tracked vehicle and configured to be rotated by the drive means. The hub member H is thus arranged to rotate about the centre axis Z, see FIGS. 2 and 3.

The hub member H has according to this embodiment spokes. The hub member according to the present disclosure may have any suitable configuration. The drive means may according to an aspect of the present disclosure, not shown, be arranged in connection to the drive wheel such that the drive means, e.g. an electric machine, at least partly is accommodated within the periphery of the drive wheel, the drive means axle essentially coaxially coinciding with the centre axis Z of the drive wheel.

The hub member H has a first side H1 and an opposite second side H2. The hub member H has a front side H1 and an opposite rear side H2, see FIG. 3. The front side H1 is configured to face out from the vehicle and the rear side H2 is configured to face towards the vehicle, when the drive wheel DW is mounted to the vehicle. The front side H1 is thus facing out from the side of the vehicle, i.e. in the transversal direction of the vehicle, when the drive wheel DW is mounted to the vehicle. The rear side H2 is thus facing towards the vehicle in the transversal direction of the vehicle, when the drive wheel DW is mounted to the vehicle. The front side H1 of the hub member may be denoted outer side H1 of the hub member H since it faces outwardly from the vehicle in the lateral direction of the vehicle. The rear side H2 of the hub member may be denoted inner side H2 of the hub member H since it faces inwardly in the lateral direction of the vehicle.

According to an embodiment of the present disclosure said drive wheel DW comprises an outer drive sprocket member S1 arranged on the front side H1 of the hub member H and an inner drive sprocket member S2 arranged on the rear side H2 of the hub member H.

The respective drive sprocket member S1, S2 comprises a set of teeth 10 arranged around the circumference of said drive sprocket member S1, S2. According to this embodiment, the outer drive sprocket member S1 comprises a set of teeth 10 arranged around the circumference of said outer drive sprocket member S1. According to this embodiment, the inner drive sprocket member S2 comprises a set of teeth 10 arranged around the circumference of said inner drive sprocket member S2.

Said teeth are 10 configured to engage with an endless track of the tracked vehicle.

The respective drive sprocket member S1, S2 comprises a support member 20 for teeth of said drive sprocket member S1, S2. According to this embodiment, the outer drive sprocket member S1 comprises a support member for teeth 10 of said outer drive sprocket member S1. According to this embodiment, the inner drive sprocket member S2 comprises a support member for teeth 10 of said inner drive sprocket member S2.

Said teeth 10 are configured to be removably attached to said support member 20.

The support member 20 of the respective drive sprocket member S1, S2 has, according to the embodiment in FIGS. 2 and 3, a ring shaped configuration. The support member 20 of the respective drive sprocket member S1, S2 has an outer side 20a and an opposite inner side 20b.

The support member 20 of the respective drive sprocket member S1, S2 has a front side 20c and an opposite rear side 20d.

The front side 20c of the support member 20 of the outer drive sprocket member S1 is configured to face away from the front side H1 of the hub member H when attached to the hub member H. The front side 20c of the support member 20 of the inner drive sprocket member S2 is configured to face away from the rear side H2 of the hub member H when attached to the hub member H.

The rear side 20d of the support member 20 of the outer drive sprocket member S1 is configured to face towards the front side H1 of the hub member H when attached to the hub member H. The rear side 20d of the support member 20 of the inner drive sprocket member S2 is configured to face towards the rear side H2 of the hub member H when attached to the hub member H.

Said teeth 10, when arranged on and distributed around the support member 20 of the respective drive sprocket member S1, S2, are configured to protrude from said outer side 20a so as to engage with said endless track.

Said teeth 10, when arranged on and distributed around the support member 20 of the respective drive sprocket member S1, S2, are configured to project from said front side 20c.

The drive wheel according to the present disclosure may according to an aspect of the present disclosure, not shown, be provided with a single drive sprocket member. The drive wheel according to the present disclosure may according to an aspect of the present disclosure be provided with a single drive sprocket member, not shown, having teeth arranged around the circumference of said single drive sprocket member and one support member for said teeth. The teeth are configured to be removably attached to the single support member of the drive sprocket member, not shown.

The drive wheel DW comprises a fastening arrangement A for facilitating fastening one or more teeth 10 of the set of teeth 10 to the support member 20. The drive wheel DW comprises a fastening arrangement A for facilitating fastening one or more teeth 10 of the set of teeth 10 to the respective support member 20.

Said fastening arrangement A is configured for fastening one or more teeth 10 of the set of teeth 10 to the support member 20. Said fastening arrangement A comprises a set of dovetail shaped recesses 22 of said support member 20. Said support member 20 is thus provided with dovetail shaped recesses 22. According to this embodiment of the present disclosure, the support member 20 of the outer drive sprocket member S1 comprises a set of dovetail shaped recesses 22 circumferentially arranged around its support member 20. According to this embodiment of the present disclosure, the support member 20 of the inner drive sprocket member S2 comprises a set of dovetail shaped recesses 22 circumferentially arranged around its support member 20.

Each dovetail shaped recess 22 is configured to receive a locking portion 12 of one or more teeth 10 so as to provide a locking function for said one or more teeth 10.

The set of dovetail shaped recesses 22 are arranged on the front side 20c of the support member 20 of the respective drive sprocket member S1, S2.

According to an aspect of the present disclosure the fastening arrangement A further comprises a bolt joint J1 for attaching one or more teeth 10 in association with a dovetail shaped recess 22 of the support member 20 of the respective drive sprocket member S1, S2.

According to an aspect of the present disclosure the fastening arrangement A comprises a set of attachment members 24 arranged around the side of the respective ring shaped support member 20 in connection to said dovetail shaped recesses 22, see FIG. 2 showing the set of attachment members 24 for the inner drive sprocket member S2. The each attachment member 24 is according to this embodiment arranged in connection to a dovetail shaped recess 22. The respective attachment member 24 is arranged to receive a bolt joint J1 for attaching the respective tooth 10 to the support member 20.

According to this embodiment the respective drive sprocket member S1, S2 comprises a set of fastening members 26 arranged around the inner side 20b of the respective ring shaped support member 20, see FIG. 2 showing the set of fastening members 26 for the inner drive sprocket member S2. The respective fastening member 26 comprises or is arranged to receive a bolt joint J2 for attaching the respective drive sprocket member S1, S2 to the hub member H of the drive wheel DW. According to this embodiment the fastening members 26 are attached to spokes of the hub member H.

The outer drive sprocket member S1 and hence the fastening arrangement A is described in more detail below, with reference to FIGS. 4, 5a and 5b.

Figure 4:
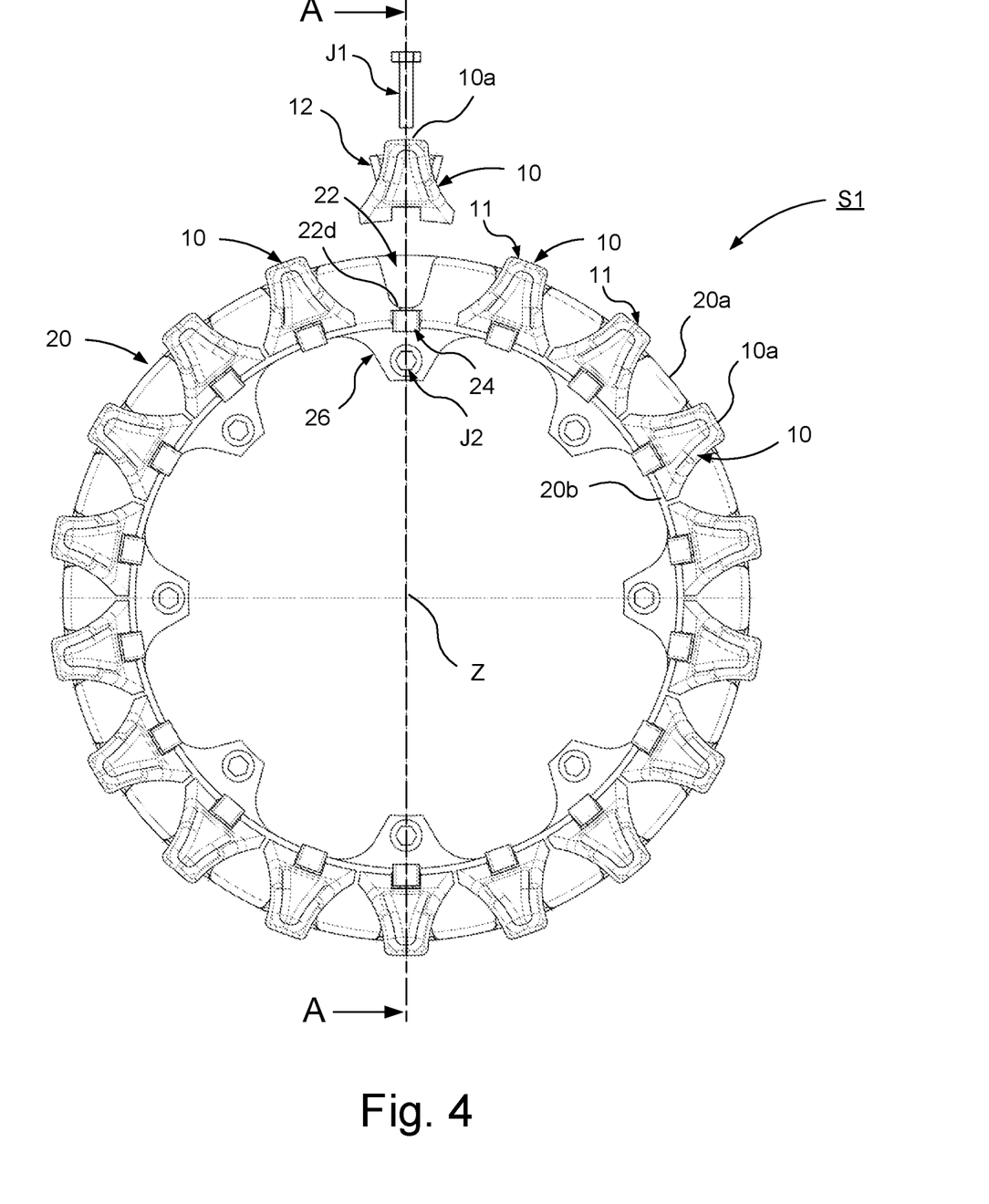
FIG. 4 schematically illustrates a front view of a drive sprocket member of a drive wheel for an endless track of a tracked vehicle according to an embodiment of the present disclosure.

FIG. 4 schematically illustrates a front view of a drive sprocket member S1 of a drive wheel for an endless track of a tracked vehicle according to an embodiment of the present disclosure; FIG. 5a schematically illustrates a side view of the drive sprocket member S1 in FIG. 4 according to an embodiment of the present disclosure; and FIG. 5b schematically illustrates a cross sectional side view A-A of the drive sprocket member S1 in FIG. 4 according to an embodiment of the present disclosure.

The drive wheel comprising such a sprocket member S1 may be a drive wheel according to the drive wheel DW in FIG. 1. The drive wheel comprising such a sprocket member S1 may be a drive wheel according to the drive wheel DW in FIGS. 2 and 3.

Figure 6A:
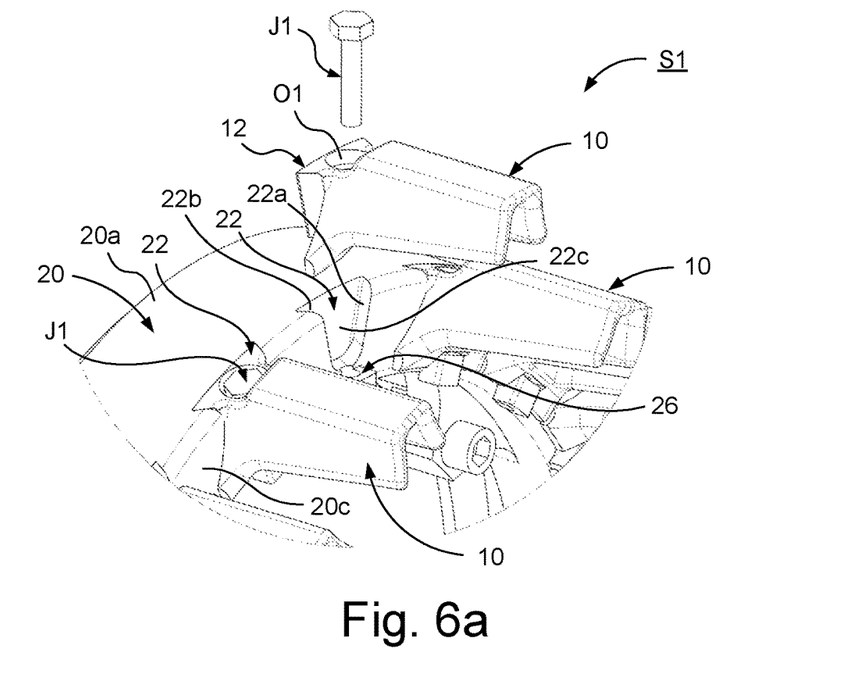
FIG. 6a schematically illustrates a perspective view of a portion of the drive sprocket member in FIG. 4 according to an embodiment of the present disclosure.
Figure 6B:
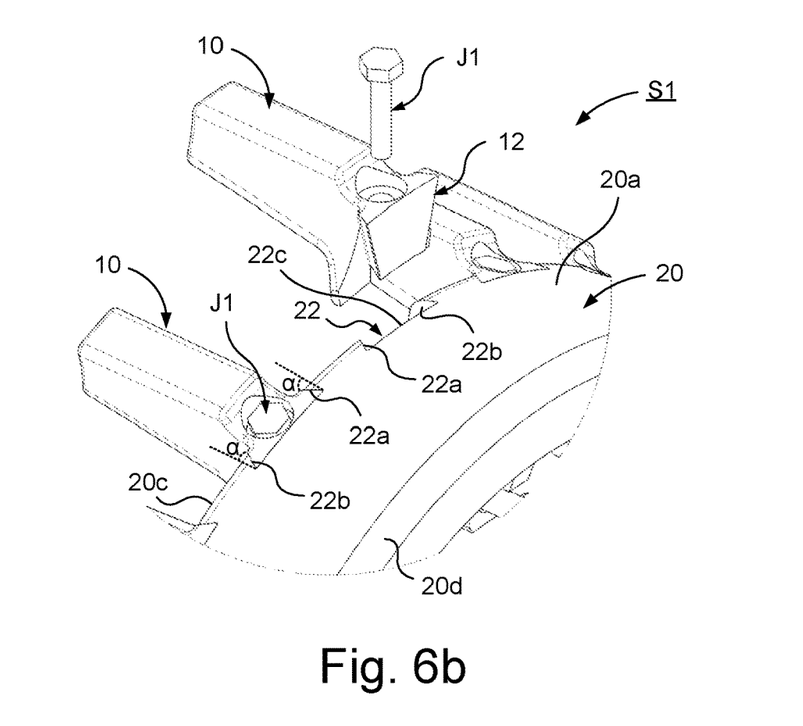
FIG. 6b schematically illustrates a perspective view of a portion of the drive sprocket member in FIG. 4 according to an embodiment of the present disclosure.

FIG. 6a schematically illustrates a perspective view of a portion of the drive sprocket member S1 in FIG. 4 according to an embodiment of the present disclosure; and FIG. 6b schematically illustrates a perspective view of a portion of the drive sprocket member S1 in FIG. 4 according to an embodiment of the present disclosure.

The drive sprocket member S1 has a centre axis Z about which the drive sprocket member is intended to rotate during drive of the vehicle.

The drive sprocket member S1 is according to an aspect of the present disclosure an outer drive sprocket member S1 of a drive wheel, e.g. the drive wheel DW in FIG. 2-3, comprising an inner drive sprocket member arranged on the inner side of a hub member of the drive wheel and an outer drive sprocket member arranged on the outer side of the hub member.

The drive sprocket member S1 comprises a set of teeth 10 arranged around the circumference of said drive sprocket member S1.

The drive sprocket member S1 comprises a support member 20 for teeth 10 of said drive sprocket member S1.

The support member 20 has according to an aspect of the present disclosure a ring shaped configuration. The support member 20 has an outer side 20a providing an outer surface configured to face the endless track of the track assembly of the vehicle when the drive wheel is mounted to the tracked vehicle.

The teeth 10, when arranged on and distributed around the support member 20, are configured to project from said outer side 20a. Thus, a portion 11 of said teeth 10 is configured to project from said outer side 20a so as to engage with said endless track.

The teeth 10, when arranged on and distributed around the support member 20, have an outer side 10a providing an outer surface configured to face the endless track of the track assembly of the vehicle when the drive wheel is mounted to the tracked vehicle. The outer side 10a of said teeth 10 correspond to a surface portion of said portion 11 of said teeth. Said surface portion and hence outer side 10a of said teeth is configured to engage with said endless track.

The teeth 10, when arranged on and distributed around the support member 20, have an inner side 10b configured to face towards the axis Z of the drive wheel, and hence the drive sprocket member S1.

The support member 20 according to an aspect of the present disclosure has an inner side 20b opposite to said outer side 20a. The support member 20 according to an aspect of the present disclosure has a front side 20c and an opposite rear side 20d.

The dovetail shaped recess 22 is arranged on the front side 20c of said support member 20.

The teeth 10 are configured to be removably attached to said support member 20.

The drive sprocket member S1 comprises a fastening arrangement A for facilitating fastening one or more teeth 10 of the set of teeth 10 to the support member 20. The drive sprocket member S1 comprises a fastening arrangement A for facilitating fastening one or more teeth 10 of the set of teeth 10 to the respective support member 20.

Said fastening arrangement A is configured for fastening one or more teeth 10 of the set of teeth 10 to the support member 20. Said fastening arrangement A comprises a set of dovetail shaped recesses 22 of said support member 20. Said support member 20 is thus provided with dovetail shaped recesses 22.

Each dovetail shaped recess 22 is configured to receive a locking portion 12 of one or more teeth 10 so as to provide a locking function for said one or more teeth 10. According to this embodiment, each dovetail shaped recess 22 is configured to receive a locking portion 12 of one tooth 10 so as to provide a locking function for said one or more teeth 10. According to this embodiment, each tooth 10 comprises a locking portion 12 configured to lockingly fit in said dovetail shaped recess 22.

An embodiment of a tooth 10 of the set of teeth 10 of the drive sprocket member S1 is described in more detail with reference to FIGS. 7a-b and 8a-b. The locking portion 12 of a tooth 10 of the set of teeth 10 of the drive sprocket member S1 is described in more detail with reference to FIGS. 7a-b and 8a-b.

According to an aspect of the present disclosure the fastening arrangement A further comprises a bolt joint J1 for attaching one or more teeth 10 in association with a dovetail shaped recess 22.

The set of dovetail shaped recesses 22 are arranged on the front side 20c of the support member 20. Each dovetail shaped recess 22 is configured to run radially in said support member 20. Each dovetail shaped recess 22 is configured to run radially on the front side 20c of said support member 20.

Said dovetail shaped recess 22 is configured to narrow in the radial direction from the periphery towards the centre of the support member 20. Said dovetail shaped recess 22 is configured to narrow in the radial direction from the periphery of the support member 20 towards the centre, i.e. the central point of the support member associated with the centre axis of the sprocket member S1, of the support member 20. Said dovetail shaped recess 22 is configured to narrow in the radial direction from the outer side 20a of the support member 20 towards the centre of the support member 20.

Said dovetail shaped recess 22 has opposite inner walls 22a, 22b. Said opposite inner walls 22a, 22b constitutes a first inner wall 22a and an opposite second inner wall 22b. The inner walls 22a, 22b are configured to run from the outer side 20a along the front side 20c towards a central portion of the support member 20. The inner walls 22a, 22b are configured to run towards each other from the outer side towards a central area of the support member 20 and are thus narrowing each other.

The inner walls 22a, 22b are configured to run from the front side 20c towards a recess bottom 22c. The recess bottom 22c is thus running from the outer side 20a along the front side 20c towards a central portion of the support member 20. The dovetail shaped recess 22 thus has inner walls 22a, 22b and a recess bottom 22c. The dovetail shaped recess 22 has an inner end 22d at a certain distance from the inner side 20b of the support member 20, see FIG. 4. The inner end 22d of the respective dovetail shaped recess 22 is according to this embodiment arranged in connection to the attachment member 24.

As illustrated in FIG. 6b, the respective inner wall 22a, 22b of said recess 22 has an inclination α relative to the direction perpendicular to the radial direction of the support member 20. The respective inner wall 22a, 22b of said recess 22 has an inclination α relative to the direction parallel to the axial direction of the support member 20. The inclination α of the respective inner wall 22a, 22b is such that the inner walls 22a, 22b are leaning towards each other.

Said dovetail shaped recess 22 is thus configured to narrow outwardly from said support member 20. Said dovetail shaped recess 22 is thus configured to narrow towards said front side 20c of said support member 20. Said dovetail shaped recess 22 is thus configured to narrow from said recess bottom 22c towards said front side 20c of said support member 20.

Figure 5A:
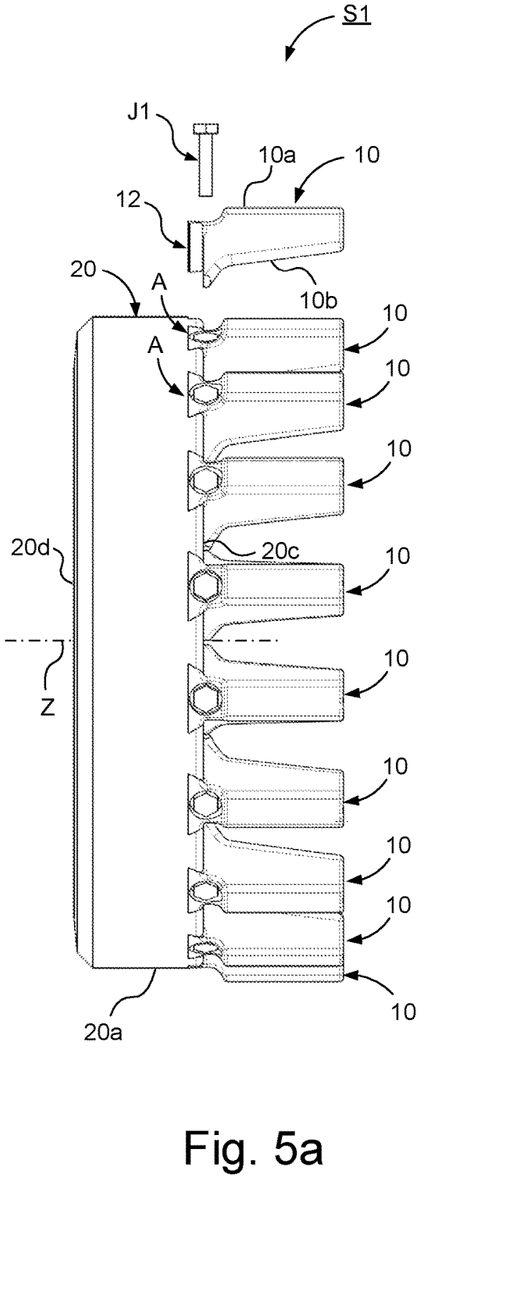
FIG. 5a schematically illustrates a side view of the drive sprocket member in FIG. 4 according to an embodiment of the present disclosure.
Figure 5B:
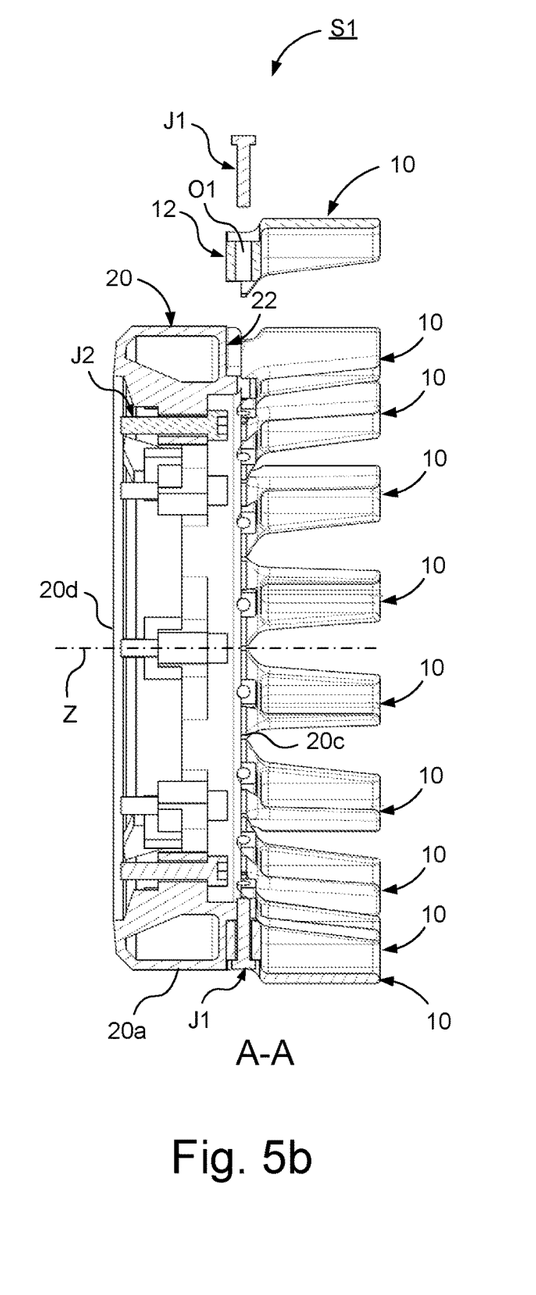
FIG. 5b schematically illustrates a cross sectional side view of the drive sprocket member in FIG. 4 according to an embodiment of the present disclosure.

According to the embodiment illustrated in e.g. FIG. 4 and FIG. 5a-b each tooth 10 is configured to be attached to the support member 20 in connection to a dovetail shaped recess 22. According to the embodiment illustrated in e.g. FIG. 4 and FIG. 5a-b each tooth 10 comprises an opening O1, i.e. a through hole, for receiving a bolt joint J1. The opening O1 is arranged in connection to the locking portion 12 of the respective teeth 10.

According to an aspect of the present disclosure the fastening arrangement A comprises a set of attachment members 24 arranged around the side of the respective ring shaped support member 20 in connection to said dovetail shaped recesses 22, see FIG. 4. Each attachment member 24 is according to this embodiment arranged in connection to a dovetail shaped recess 22. The respective attachment member 24 is arranged to receive a bolt joint J1 for attaching the respective tooth 10 to the support member 20.

According to this embodiment the drive sprocket member S1 comprises a set of fastening members 26 arranged around the inner side 20b of the ring shaped support member 20. The respective fastening member 26 comprises or is arranged to receive a bolt joint J2 for attaching the drive sprocket member S1 to the hub member of the drive wheel, see FIG. 4.

Figure 7A:
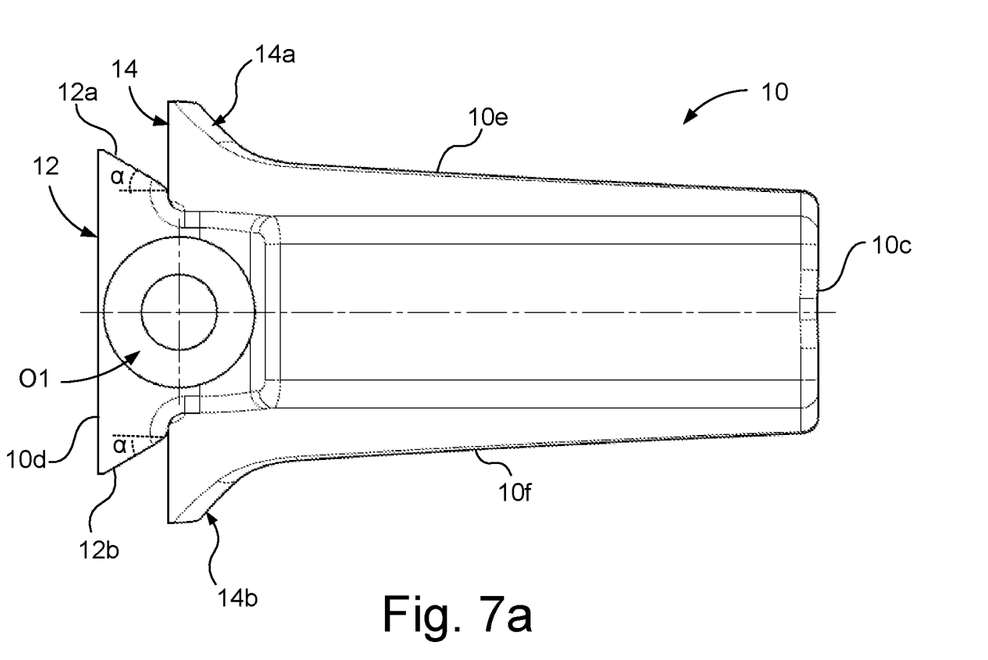
FIG. 7a schematically illustrates a plan view of a tooth of the drive sprocket member in FIG. 4 according to an embodiment of the present disclosure.
Figure 7B:
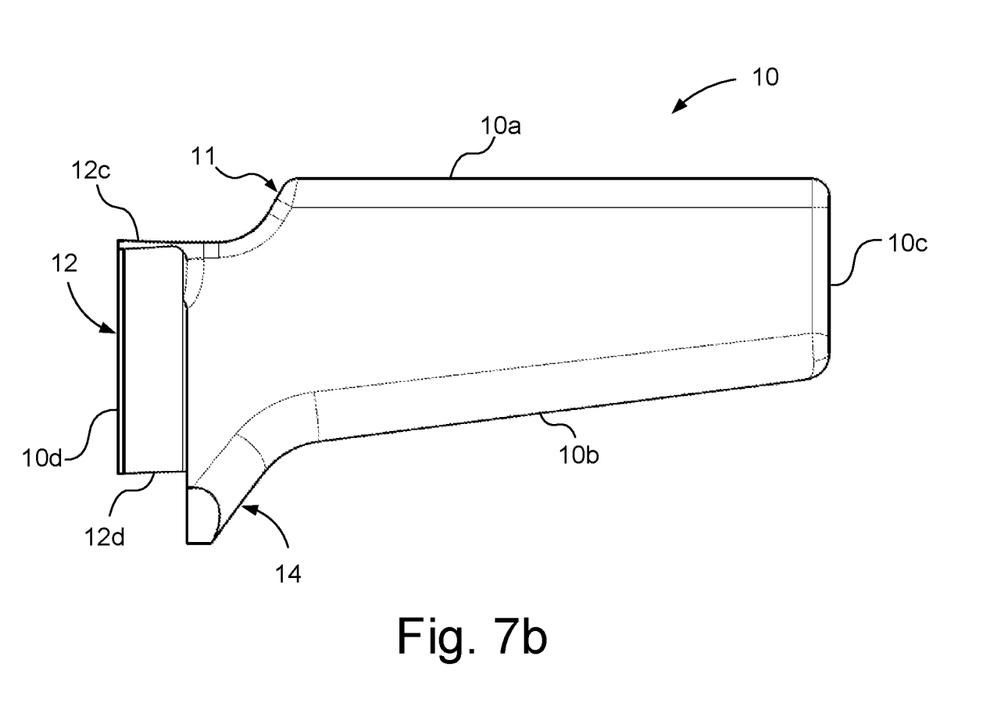
FIG. 7b schematically illustrates a side view of the tooth in FIG. 7a according to an embodiment of the present disclosure.
Figure 8A:
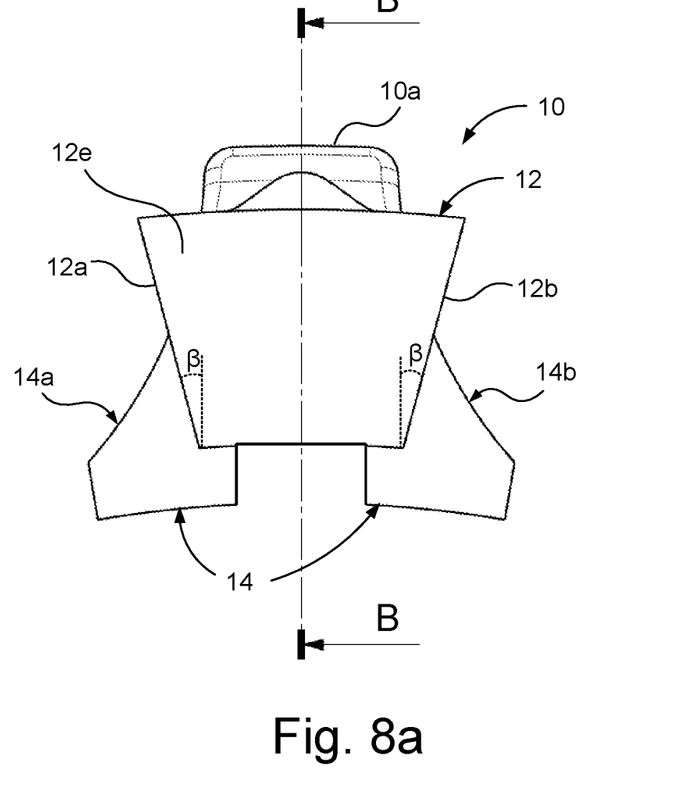
FIG. 8a schematically illustrates a rear view of the tooth in FIG. 7a according to an embodiment of the present disclosure.
Figure 8B:
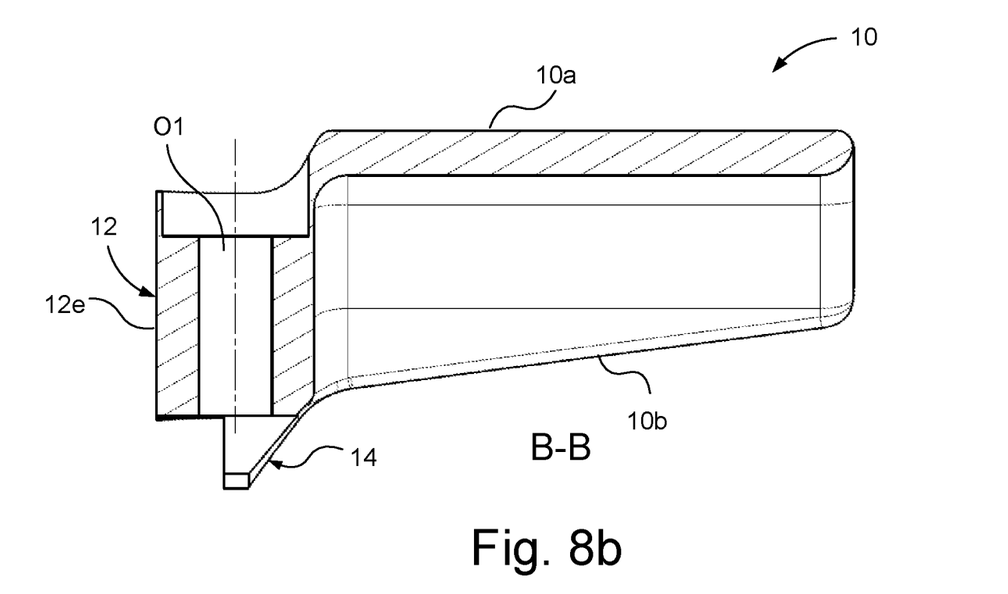
FIG. 8b schematically illustrates a cross sectional side view of the tooth in FIG. 7a according to an embodiment of the present disclosure.

FIG. 7a schematically illustrates a plan view of a tooth 10 of the drive sprocket member S1 in FIGS. 2 and 4 according to an embodiment of the present disclosure; FIG. 7b schematically illustrates a side view of the tooth 10 in FIG. 7a according to an embodiment of the present disclosure; FIG. 8a schematically illustrates a rear view of the tooth 10 in FIG. 7a according to an embodiment of the present disclosure; and FIG. 8b schematically illustrates a cross sectional side view of the tooth 10 in FIG. 8a according to an embodiment of the present disclosure.

Said tooth 10 has an outer side 10a providing an outer surface configured to face the endless track of the track assembly of the vehicle when the tooth 10 is attached to the support member and the drive wheel is mounted to the tracked vehicle, see FIG. 7b. Said tooth 10 has an inner side 10b opposite to said outer side 10a, see FIG. 7b.

Said tooth 10 has front side 10c configured to project from the front side of the support member when the tooth 10 is attached to the support member, see FIG. 7a-b. Said tooth 10 has rear side 10d opposite to said front side 10c, said rear side being configured to face the front side of the support member when the tooth 10 is attached to the support member, see FIG. 7a-b.

The tooth 10, when arranged on and distributed around the support member 20, is configured to project from the outer side 20a of the support member 20 with a portion 11 of said tooth 10 so as to engage with said endless track, see e.g. FIG. 4. The outer side 10a of said teeth 10 correspond to a surface portion of said portion 11 of said tooth 10.

Said tooth 10 has a first long side 10e configured to run from the front side 10c towards the rear side 10d, see FIG. 7a. Said tooth 10 has a second long side 10f, opposite to said first long side 10e, configured to run from the front side 10c towards the rear side 10d, see FIG. 7a.

Said tooth 10 has a locking portion 12. The locking portion 12 is shaped to fit into a dovetail shaped recess 22 of the support member 20, see e.g. FIG. 7a-b.

Said tooth 10 has a wing element 14 arranged in the rear portion of the tooth 10. The locking portion 12 is configured to project rearwardly from the wing portion 14. The wing element 14 comprises a first wing portion 14a. The first long side 10e is configured to transcend into said first wing portion 14a. The wing element 14 comprises a second wing portion 14b opposite to the first wing portion 14a. The second long side 10f is configured to transcend into said second wing portion 14b.

The locking portion 12 has opposite outer walls 12a, 12b. Said opposite outer walls 12a, 12b constitutes a first outer wall 12a and an opposite second outer wall 12b. The outer walls 12a, 12b are configured to face the inner walls 22a, 22b of the dovetail shaped recess 22 when the tooth 10 is attached to the support member 20. The outer walls 12a, 12b are configured to run from the outer side 10a along the front side 20c towards a central portion of the support member 20.

The locking portion 12 has an outer side 12c configured to face in the same direction as the outer side 20a of the support member 20 when the tooth 10 is attached to the support member 20.

The locking portion 12 has an inner side 12d, opposite to said outer side 12c, configured to face towards the inner end 22d of the dovetail shaped recess 22 of the support member 20 when the tooth 10 is attached to the support member 20.

The outer walls 12a, 12b are configured to run towards each other from the outer side towards a central area of the support member 20 and are thus narrowing each other from the outer side 12c towards the inner side 12d.

The rear side 10d of the tooth constitutes the surface side 12e of the locking portion 12 configured to face the recess bottom 22c of the dovetail shaped recess 22 of the support member, see e.g. FIG. 7a-b and FIG. 6a.

According to an aspect of the present disclosure, the locking portion 12 thus has opposite outer walls 12a, 12b configured to face and at least partly engage with the opposite inner walls 22a, 22b of the dovetail shaped recess 22, and a surface side 12e configured to face and at least partly engage with the recess bottom 22c of the dovetail shaped recess 22, providing efficient geometrical locking.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. A fastening arrangement of a drive wheel for an endless track of a tracked vehicle, the drive wheel comprising a hub member and a drive sprocket member, said drive sprocket member comprising a set of teeth arranged around the circumference of said drive sprocket member, said teeth being configured to engage with said endless track, said drive sprocket member further comprising a support member for teeth of said drive sprocket member, said teeth being configured to be removably attached to said support member, said fastening arrangement being configured for fastening one or more teeth of the set of teeth to the support member, said fastening arrangement comprising a set of dovetail shaped recesses of said support member, each dovetail shaped recess being configured to receive a locking portion of one or more teeth so as to provide a locking function for said one or more teeth and is configured to narrow in the radial direction from the periphery towards the centre of the support member.

2. The fastening arrangement according to claim 1, wherein said support member has a front side, wherein the dovetail shaped recess is arranged on the front side of said support member.

3. The fastening arrangement according to claim 1, wherein said dovetail shaped recess is configured to run radially in said support member.

4. The fastening arrangement according to claim 2, wherein said dovetail shaped recess is configured to run radially on the front side of said support member.

5. The fastening arrangement according to claim 1, wherein said dovetail shaped recess is configured to narrow outwardly from said support member.

6. The fastening arrangement according to claim 1, wherein said dovetail shaped recess is configured to narrow in a direction away from the hub member.

7. The fastening arrangement according to claim 2, wherein said dovetail shaped recess has opposite inner walls and a recess bottom, the dovetail shaped recess being configured to narrow from said recess bottom towards said front side of said support member.

8. The fastening arrangement according to claim 1, wherein said dovetail shaped recess is arranged to receive a locking portion of one tooth.

9. The fastening arrangement according to claim 1, wherein said dovetail shaped recess is arranged to receive a locking portion of more than one tooth.

10. The fastening arrangement according to claim 1, said fastening arrangement further comprising a bolt joint for attaching one or more teeth in association with a dovetail shaped recess.

11. The fastening arrangement according to claim 1, wherein said dovetail shaped recess is arranged to face away from said hub member.

12. The fastening arrangement according to claim 2, wherein said front side of the support member is arranged to face away from said hub member.

13. The fastening arrangement according to claim 1, said drive wheel comprising an outer drive sprocket member arranged on the outer side of the hub member and an inner drive sprocket member arranged on the inner side of the hub member.

* * * * *